Feb. 14, 1950 E. E. A. NORREFELDT ET AL 2,497,737
CLINCHING OF NAILS, WHEN JOINING
PIECES OF WOOD OR THE LIKE
Filed Jan. 21, 1948 3 Sheets-Sheet 1
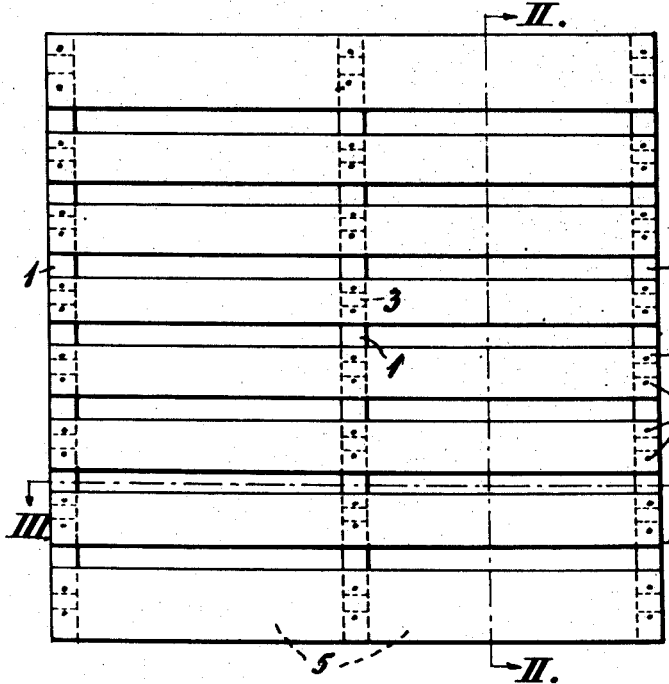
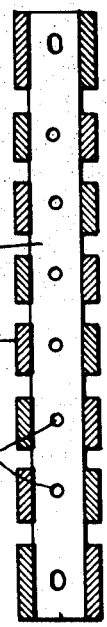
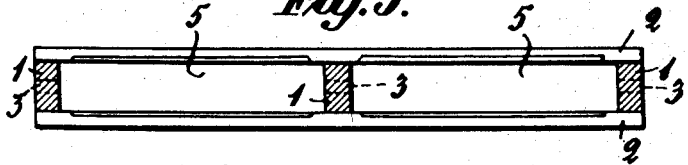
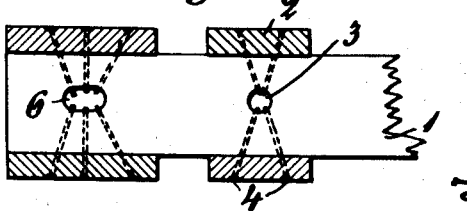

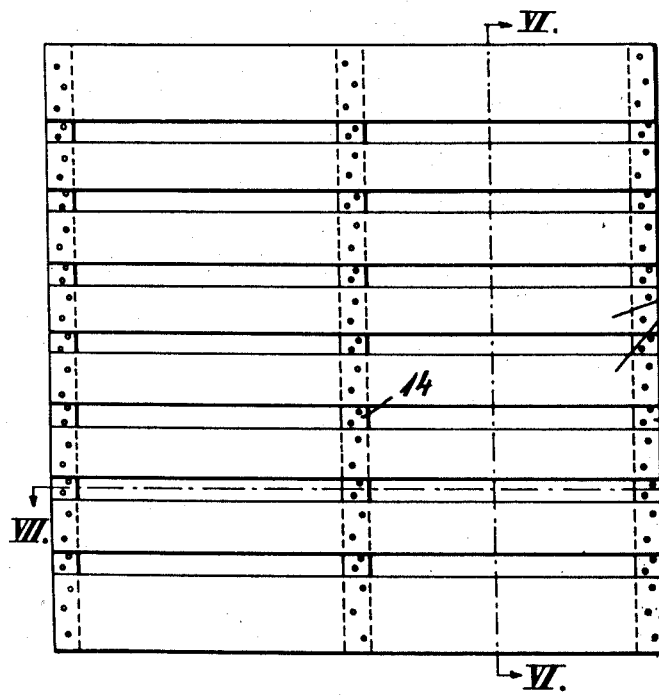
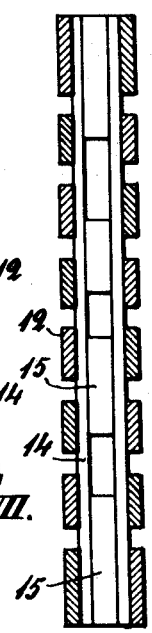
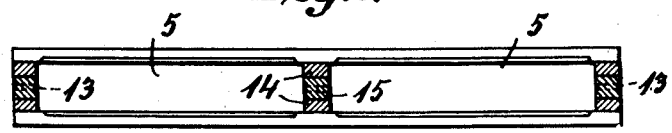
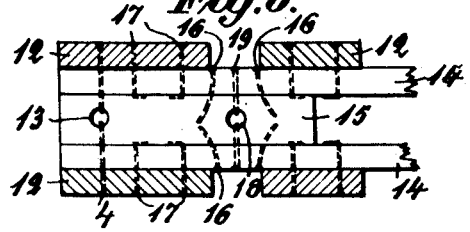

Feb. 14, 1950 E. E. A. NORREFELDT ET AL 2,497,737
CLINCHING OF NAILS, WHEN JOINING
PIECES OF WOOD OR THE LIKE
Filed Jan. 21, 1948 3 Sheets-Sheet 3
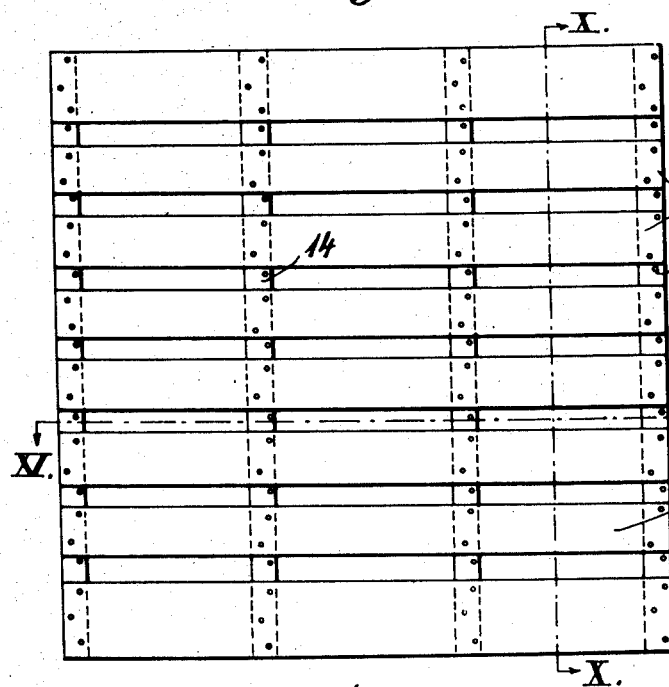
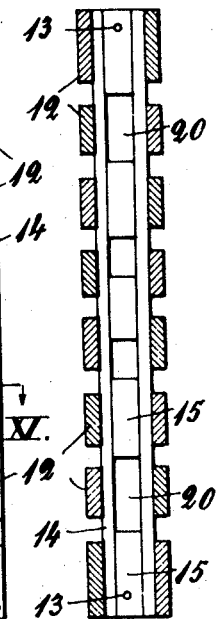
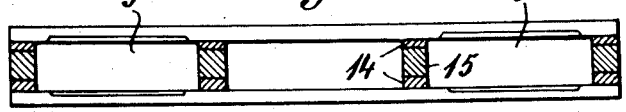
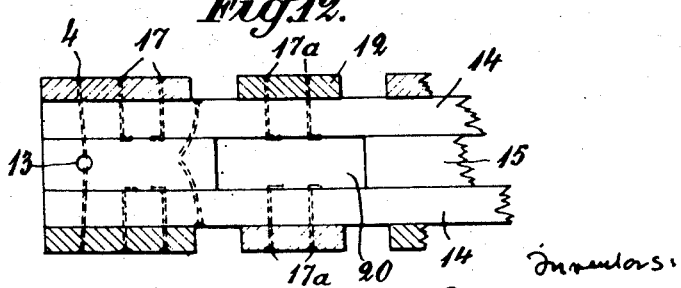

Patented Feb. 14, 1950

2,497,737

UNITED STATES PATENT OFFICE 2,497,737

CLINCHING OF NAILS WHEN JOINING PIECES OF WOOD OR THE LIKE

Ernst Eric Alfred Norrefeldt and Hans Erik Edvin Holst, Lidingo, Sweden, assignors to Hyresgästernas Sparkasse- och Byggnadsföreningars Riksförbund u. p. a., Stockholm, Sweden, a corporation of Sweden Application January 21, 1948, Serial No. 3,634
In Sweden January 16, 1947

Section 1, Public Law 690, August 8, 1946
Patent expires January 16, 1967

5 Claims. (Cl. 1—1)

This invention relates to a method of clinching nails, when joining wooden parts or the like, and to articles made in this way.

The clinching of nails in wood joints is usually effected in such a manner that the free end of the nail projecting out of the joint is bent over with a hammer. This method cannot, however, be adopted, when the nail is so short that its point does not project beyond the surface of the wood. In such cases the nail has just been left unclinched, which entails the risk, however, that the nail may work loose or that its head may stand up over the surface of the wood. This is more particularly the case, when the wood joint in question is subjected to stresses in such a direction that the wood parts will have the tendency to separate from one another.

The invention has for its main object to overcome these disadvantages by first providing one or more holes or cavities in the wood joint at substantially right angles to the nailing direction at such a distance from the surface of the wood that one or more nails hammered into the wood can penetrate with their free ends into the hole, whereupon these ends are clinched by means of a tool, for instance a piece of bar or tubing, introduced in the longitudinal direction of the hole. In this way it is possible with simple means to carry out a particularly effective clinching of the nails in the wood.

The invention can be applied with great advantage for various kinds of wood joints, for instance when making wooden packing cases. Another important sphere of application is the manufacture of loading cradles or pallets for so-called fork trucks, that is mechanically or electrically driven vehicles provided with a strong "fork" capable of being raised and lowered, which can be inserted under the load intended for transport, raise it, transport it to the desired place and lower it there to the desired level. For facilitating the insertion of the fork under the goods intended for transport and for carrying these goods and distributing them in smaller lots suitable for transport loading cradles or pallets are used, which are adapted to receive the fork of the fork truck and by means of it can carry a certain quantity of goods. These loading cradles or pallets are often subjected to very rough treatment, so that great demands are made on their strength. On the other hand, they are often required in great numbers and must therefore be both cheap and light. One object of the invention is to make these loading cradles or pallets of wood parts which are nailed together in accordance with the invention, so as to obtain a loading cradle or pallet construction, which fulfills these requirements and with which there is no danger of the nail heads projecting above the surface of the cradle and thereby damaging the goods.

In the accompanying drawings some constructional examples of the invention are shown, as applied to loading cradles or pallets of the above-mentioned kind.

Figures 1, 2 and 3 show one constructional form of the loading cradle or pallet in plan view, longitudinal section and cross section and in Figure 4 in longitudinal section to a larger scale.

Figures 5 to 8 are similar views of another constructional form and

Figures 9 to 12 of a third constructional form. Figure 12 being a longitudinal section on a larger scale.

According to Figs. 1 to 4 the loading cradle or pallet consists of a number of cross bars (for instance three), on the two sides of which are boards 2, preferably in pairs opposite one another and distanced apart. The boards are fixed to the cross bars 1 by means of nails 4. This known cheap construction has the disadvantage referred to above, that the nails 4 will gradually be pulled out between the boards and the crossbars and may thereby damage the goods on the loading cradle or pallet, besides which the cohesion of the cradle parts will be reduced or will cease. According to the invention the cross bars are provided with a number of holes 3, namely one hole approximately for each pair of boards 2 secured to the cross bar. In nailing the boards to the cross bars, they are driven in such a manner that the points of the nails enter the said holes 3, whereupon the points are bent over, for instance by driving a drift or some other suitable tool from the side through the hole 3 and thereby bending over the points of the nails (Fig. 4). This provides a permanent connection between the different parts of the cradle or pallet without the use of costly and inconvenient bolts, simply by the cheap operation of nailing them together. The nails used may be relatively thin and short, which renders the manufacture of the cradle still cheaper.

The cross bars 1 are arranged at such a distance apart that suitable spaces 5 result, into which the fork of the truck can be inserted.

As will be seen from Fig. 4 at 6, the hole may be of other cross section than circular.

According to a modification of the above constructional form the solid cross bars 1 of Figs. 1 to 4 are exchanged for composite cross bars according to Figs. 5 to 8, which are built up out of full length ribs 14 and short intermediate pieces 15 placed between them, the total thickness of the ribs 14 and the intermediate pieces 15 (measured perpendicularly to the plane of the cradle) corresponding to the total height of the cross bar 1 of Figs. 1 to 4. The intermediate pieces 15 may be made of cheap short waste pieces from the manufacture of other articles. The nailing of the outer boards 12 to the ribs may be carried out at least in part in such a manner that the nails are bent over and clinched on the inside of the ribs (see the nails 17 in Fig. 8). The units thus nailed together out of boards 12 and ribs 14, one on the under side and one at the upper side of the cradle, are then connected to the intermediate pieces 15 by means of separate nails 4 which are clinched in the holes 13. Between the bores the ribs 14 may be connected to the intermediate pieces 15, so that there will be a certain anchoring between the ribs 14 and the intermediate pieces 15. This anchoring can, however, also be effected through the intermediate pieces 15 being provided in the manner described above with holes 18, towards which the points of the nails 19 are directed and in which the points are bent over and clinched in the manner already described.

Figs. 9 to 12 show a further constructional form which differs from the constructional form according to Figs. 5 to 8 substantially in this, that free spaces 20 are left laterally between the intermediate pieces 15, so that the fork of the fork truck can be inserted in these spaces. In this case the cradle can receive the fork of the fork truck in any of four directions (the cradle becomes a "four-way cradle"), which in many cases is of advantage. The space 20 is at the same time used for clinching the nails 17a.

We claim:

1. The method of securing a nail in at least two wooden parts forming a first part and a second part and thereby securing the two parts together into a unit so that the first part is superposed on the second part, which method consists in boring a hole in said second part intermediate the edges thereof substantially parallel to the mutually meeting surfaces of both parts and at right angles to the direction in which the nail is to be driven into said parts; selecting a nail which is shorter than the distance through both parts; driving the selected nail first through the first part and then into the second part toward the hole until the nail is driven and the inner end of said nail extends freely into said hole transversely of the axis thereof; and finally clinching the inner end of said nail in said hole.

2. The method of securing a plurality of nails in at least two wooden parts forming a first part and a second part and thereby securing the two parts together into a unit in such fashion that the first part is superposed on the second part, which method consists in boring at least one hole in said second part intermediate the edges thereof substantially parallel to the mutually meeting surfaces of both parts and at right angles to the general direction in which the nails are to be driven into said parts; selecting a group of nails which are shorter than the distance through both parts; driving the nails first through the first part and then into the second part toward the hole or holes until said nails are driven and the inner ends thereof extend freely into said hole or holes transversely thereto; and finally clinching the inner ends of said nails in said hole or holes to anchor said nails effectively in place.

3. The method of securing a plurality of nails in at least three wooden parts forming a first part, a second part and a third part and thereby securing the three parts together into a unit in such fashion that the first part is superposed on the second part and the third part is disposed beneath said second part, which method consists in boring at least one hole in said second part intermediate the edges thereof substantially parallel to the mutually meeting surfaces of all three parts and at right angles to the general direction in which the nails are to be driven into said parts; selecting a group of nails which are shorter than the distance through the second part and either of the first or third parts; driving some of the selected nails in one direction first through the first part and then into the second part toward the hole or holes therein until the nails are driven and the inner ends thereof extend freely into said hole or holes; driving others of said selected nails in the opposite direction first through the third part and then into said second part toward the same hole or holes therein until the nails are driven and the inner ends thereof also extend freely into said hole or holes; and finally clinching the inner ends of said group of nails in said hole or holes in order to anchor said nails effectively in place.

4. A wooden article comprising at least two wooden parts forming a first part and a second part and having nails securing them together into a unit, said nails being shorter than the distance through the two parts, and said second part having at least one hole bored therein intermediate the edges thereof substantially parallel to the meeting surface of both parts at their junction and substantially at right angles to the longitudinal axes of said nails, and the latter extending through the first part and into the second part to the hole or holes therein; and clinched inner ends on said nails in said hole or holes effectively anchoring said nails in place.

5. A wooden article comprising at least three wooden parts forming a first part, a second part, and a third part disposed in superposed relation and having nails securing them together into a unit, the nails being shorter than the distance through the second part and either of the first or third parts, the first part being superposed on the second part and the third part being disposed beneath the second part, and the latter part having at least one hole bored therein intermediate the edges thereof substantially parallel to the meeting surfaces of said three parts at their junctions and substantially at right angles to the longitudinal axes of said nails, some of the latter nails extending in one direction through the first part into the second part to the hole or holes therein, and others of said nails extending in the opposite direction through the third part into said second part to the same hole or holes therein; and clinched inner ends upon all of said nails in said hole or holes in said second part effectively anchoring said nails in place.

ERNST ERIC ALFRED NORREFELDT.
HANS ERIK EDVIN HOLST.

REFERENCES CITED

The following references are of record in the file of this patent:

UNITED STATES PATENTS

| Number | Name | Date |
|---|---|---|
| 1,363,640 | Campbell | Dec. 28, 1920 |
| 2,436,554 | Cruickshank | Feb. 24, 1948 |